No. 705,765. Patented July 29, 1902.
E. KEMPSHALL.
PLAYING BALL.
(Application filed June 14, 1902.)
(No Model.)
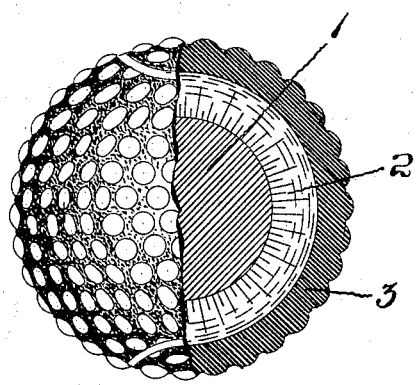
Witnesses.
Inventor
Eleazer Kempshall.
by his attorney
F. H. Richards.

UNITED STATES PATENT OFFICE.

ELEAZER KEMPSHALL, OF BOSTON, MASSACHUSETTS.

PLAYING-BALL.

SPECIFICATION forming part of Letters Patent No. 705,765, dated July 29, 1902.

Application filed June 14, 1902. Serial No. 111,773. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to cord playing-balls, especially those intended for the game of golf; and its object is to improve the flying power and other qualities of the ball and also to provide for the accurate centering of its component spheres.

My invention belongs to the class of balls of which that shown in the patent to F. H. Richards, No. 696,353, is an example. According to said patent gutta-percha is injected into a rubber sphere to form a core therein; but in subsequently applying an outer shell to said rubber sphere it is found that the heat penetrates the rubber and tends somewhat to soften and weaken the gutta-percha core, so that it does not withstand the compressive reaction of the previously-tensioned rubber, and hence is liable to become misshapen and displaced from its true central position unless care is taken in the operation.

One of the chief objects of my present improvements is to avoid the difficulty just mentioned.

A further object is to render the ball buoyant in water, so that upon falling into a stream or pool it may be easily found and recovered.

The part-sectional drawing forming part of this specification illustrates a ball made according to my improvements.

In making a filling for the ball I preferably use a shell of soft rubber, which I expand by injecting thereinto plastic material, which hardens and forms a center piece, and upon this filling I form, under heat and pressure, a plastic shell, consisting, preferably, of gutta-percha.

I inject a mineral cement or composition into the rubber sphere 1 to form a rigid core 2. The composition may consist largely or wholly of plaster-of-paris, and, if desired, sufficient magnesia may be incorporated therewith to render the ball buoyant in water. The composition while in a plastic condition is injected into the rubber ball with sufficient force to expand the same and hardens while the pressure is maintained, forming a core of stone-like consistency.

The described core is not affected by the heat present at the operation of forming a gutta-percha shell 3 upon the ball, so that neither the core nor the rubber shell is changed in form, and the core maintains its true central position within the rubber shell. Moreover, it is found in practice that a rigid core of this character enhances the flying power of a ball, especially when it is inclosed in a tensioned rubber shell or envelop, and the whole is provided with a gutta-percha cover, which holds the rubber under compression.

Thus it will be seen that by means of my improvement the components of the ball are rendered stable at the operation of applying a plastic shell thereto, that the action of the ball in play is improved, and that the ball is rendered buoyant in water.

Having described my invention, I claim—

1. A playing-ball comprising a spherical soft-rubber shell inflated or distended by mineral cement injected thereinto and forming a core of stone-like consistency.

2. In a playing-ball, the combination of a spherical shell formed of springy material and inflated or distended by cement injected thereinto, said cement consisting at least partially of plaster-of-paris; and a hard casing formed of plastic material upon said springy shell.

3. A playing-ball comprising a rubber shell and a core filling the same, said core consisting chiefly or wholly of plaster-of-paris and magnesia, and a gutta-percha shell upon said rubber shell.

4. A playing-ball comprising a rubber shell and a core filling the same; said core consisting of plaster-of-paris and magnesia, and said rubber sphere being in a state of expansion upon said core, and a gutta-percha shell upon said rubber shell.

5. A playing-ball comprising a rubber shell, a rigid core filling the same, and consisting of cement and having a stone-like consistency, and a hard casing upon said shell.

6. In a playing-ball, the combination of a rubber shell, a core filling the same and consisting at least partially of plaster-of-paris, said rubber sphere being in a state of expansion upon said core, and a hard casing of plastic material upon said shell.

7. In a playing-ball, the combination of a rubber sphere, and a core within said sphere and filling the same; said core consisting of a mineral composition whose weight is less than that of water.

8. In a playing-ball, the combination of a rubber sphere, a core upon which said sphere is expanded, said core consisting of a mineral composition whose weight is less than that of water, and a shell of plastic material upon said rubber sphere.

9. In a playing-ball, the combination of a rubber sphere, expanded by a mineral composition injected thereinto and having less weight than water, and a shell of gutta-percha holding said rubber sphere under compression.

10. A golf-ball consisting of a whole rubber shell expanded by injected cement, said cement forming a core of stone-like consistency, and a shell of plastic material holding said rubber under compression; the specific gravity of the complete ball being less than that of water.

11. A playing-ball comprising a sphere of soft rubber distended by a core of plaster-of-paris injected thereinto, and a shell of gutta-percha holding said sphere under compression.

ELEAZER KEMPSHALL.

Witnesses:
B. C. STICKNEY,
JOHN O. SEIFERT.